(12) United States Patent
Egawa et al.

(10) Patent No.: US 12,224,464 B2
(45) Date of Patent: Feb. 11, 2025

(54) FUEL CELL SYSTEM

(71) Applicant: TOYOTA JIDOSHA KABUSHIKI KAISHA, Toyota (JP)

(72) Inventors: Toshihiro Egawa, Okazaki (JP); Makito Okumura, Nagoya (JP); Atsuo Iio, Nagoya (JP); Hisaya Fujioka, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 370 days.

(21) Appl. No.: 18/046,537

(22) Filed: Oct. 14, 2022

(65) Prior Publication Data
US 2023/0178769 A1 Jun. 8, 2023

(30) Foreign Application Priority Data
Dec. 7, 2021 (JP) ................................. 2021-198683

(51) Int. Cl.
| | | |
|---|---|---|
| *H01M 8/0432* | (2016.01) | |
| *G01K 13/02* | (2021.01) | |
| *H01M 8/04029* | (2016.01) | |
| *H01M 8/04664* | (2016.01) | |
| *H01M 8/04746* | (2016.01) | |

(Continued)

(52) U.S. Cl.
CPC ...... *H01M 8/04358* (2013.01); *G01K 13/026* (2021.01); *H01M 8/04029* (2013.01); *H01M 8/04664* (2013.01); *H01M 8/04768* (2013.01); *H01M 8/04955* (2013.01); *H01M 8/249* (2013.01)

(58) Field of Classification Search
CPC ......... H01M 8/04029; H01M 8/04358; H01M 8/04664; H01M 8/04768; H01M 8/249
See application file for complete search history.

(56) References Cited

U.S. PATENT DOCUMENTS

2005/0064257 A1* 3/2005 Isoda ................ H01M 8/04029
429/469
2008/0145729 A1* 6/2008 Alp .................... H01M 8/04007
429/452

(Continued)

FOREIGN PATENT DOCUMENTS

JP 2005093349 A 4/2005
JP 2020136205 A 8/2020

*Primary Examiner* — Brittany L Raymond
(74) *Attorney, Agent, or Firm* — Dickinson Wright, PLLC (57) ABSTRACT

An FC system disclosed herein may comprise a plurality of FC units, a cooler, and a controller. Each of the FC units may comprise a FC stack, a supply passage/a return passage/a circulating passage through which refrigerant passes, and first temperature sensor. The supply passage supplies the refrigerant from the cooler to the FC stack. The return passage returns the refrigerant to the cooler. The circulating passage is connected to the supply passage and the return passage. The first temperature sensor is configured to measure a temperature of the refrigerant in the supply passage at a position upstream of a merging point of the supply passage and the circulating passage. When measured values of the first temperature sensors of the plurality of the FC units do not match, the controller is configured to provide notification about malfunction of the first temperature sensor.

5 Claims, 4 Drawing Sheets

(51) Int. Cl.
*H01M 8/04955* (2016.01)
*H01M 8/249* (2016.01)

(56) References Cited

U.S. PATENT DOCUMENTS

2021/0119234 A1\* 4/2021 Farhat ................. H01M 8/0662
2021/0336282 A1\* 10/2021 Ahn ................. H01M 8/04029

\* cited by examiner

FUEL CELL SYSTEM

CROSS-REFERENCE TO RELATED APPLICATION(S)

This application claims priority to Japanese Patent Application No. 2021-198683, filed on Dec. 7, 2021, the entire contents of which are incorporated herein by reference.

TECHNICAL FIELD

The technique disclosed herein relates to a fuel cell system including a plurality of fuel cell stacks.

BACKGROUND

For example. Japanese Patent Application Publication No. 2005-093349 and Japanese Patent Application Publication No. 2020-136205 each describe a fuel cell system including a plurality of fuel cell stacks. Since the fuel cell stacks generate heat while they generate electricity, the fuel cell system includes a cooler which cools the plurality of fuel cell stacks. The fuel cell system of Japanese Patent Application Publication No. 2005-093349 includes one common cooler for the plurality of fuel cell stacks. Refrigerant supplied from the one cooler is distributed to the plurality of fuel cell stacks. The fuel cell system of Japanese Patent Application Publication No. 2020-136205 includes the same number of coolers as the fuel cell stacks, and each of the coolers cools its corresponding fuel cell stack.

For clearer description, "fuel cell" will simply be hereafter referred to as "FC". That is. "fuel cell system" will simply be referred to as "FC system". "fuel cell unit" will be referred to as "FC unit", and "fuel cell stack" will simply be referred to as "FC stack".

SUMMARY

In order to maintain temperatures of FC stacks within a suitable temperature range, a FC system includes temperature sensors each configured to measure a temperature of refrigerant to be supplied to its corresponding FC stack and a temperature of the refrigerant which passed through the FC stack. When the temperature sensors fail, the FC stacks cannot suitably be cooled. The present disclosure relates to an FC system including a plurality of FC units (FC stacks) and provides a technique for checking temperature sensors included in each of the FC units.

An FC system disclosed herein may comprise a plurality of FC units, a cooler, and a controller. Each of the FC units may comprise a FC stack, a supply passage/a return passage/a circulating passage through which refrigerant passes, a switch valve, and first to third temperature sensors. The supply passage may supply the refrigerant from the cooler to the FC stack. The return passage may return the refrigerant which passed through the FC stack to the cooler. The circulating passage may be connected to the supply passage and the return passage, and returns the refrigerant in the return passage to the supply passage. The switch valve may be configured to set a destination of the refrigerant flowing in the return passage to one of the cooler and the circulating passage. The first temperature sensor may be configured to measure a temperature of the refrigerant in the supply passage at a position upstream of a merging point of the supply passage and the circulating passage. The second temperature sensor may be configured to measure a temperature of the refrigerant in the supply passage at a position downstream of the merging point. The third temperature sensor may be configured to measure a temperature of the refrigerant in the return passage. When measured values of the first temperature sensors of the plurality of the FC units do not match, the controller may be configured to provide notification about malfunction of the first temperature sensor of at least one of the plurality of FC units. The above "provide notification about malfunction of the first temperature sensor" means to send a signal indicating that the first temperature sensor is malfunctioning to a different computer or a display device.

When the measured values of the first temperature sensors of the plurality of the FC units match, the controller may be configured to perform the following processes for each of the FC units. That is, the controller may be configured to control the switching valve so as not to flow the refrigerant to the circulating passage, and when a measured value of the first temperature sensor is different from a measured value of the second temperature sensor, provide notification about malfunction of the second temperature sensor. Further, for each of the FC units, when the measured value of the first temperature sensor and the measured value of the second temperature sensor match, the controller may be configured to perform the following processes for each of the FC units. That is, the controller may be configured to calculate an estimated temperature of the refrigerant at an outlet of the FC stack from the measured value of the second temperature sensor and an output of the FC stack. When a measured value of the third temperature sensor is different from the estimated temperature, the controller may be configured to provide notification about malfunction of the third temperature sensor.

By performing the above processes, the first to third temperature sensors in each of the FC units can be checked. Details of the technique disclosed herein and further developments will be described in "DETAILED DESCRIPTION".

DETAILED DESCRIPTION

Figure 1:
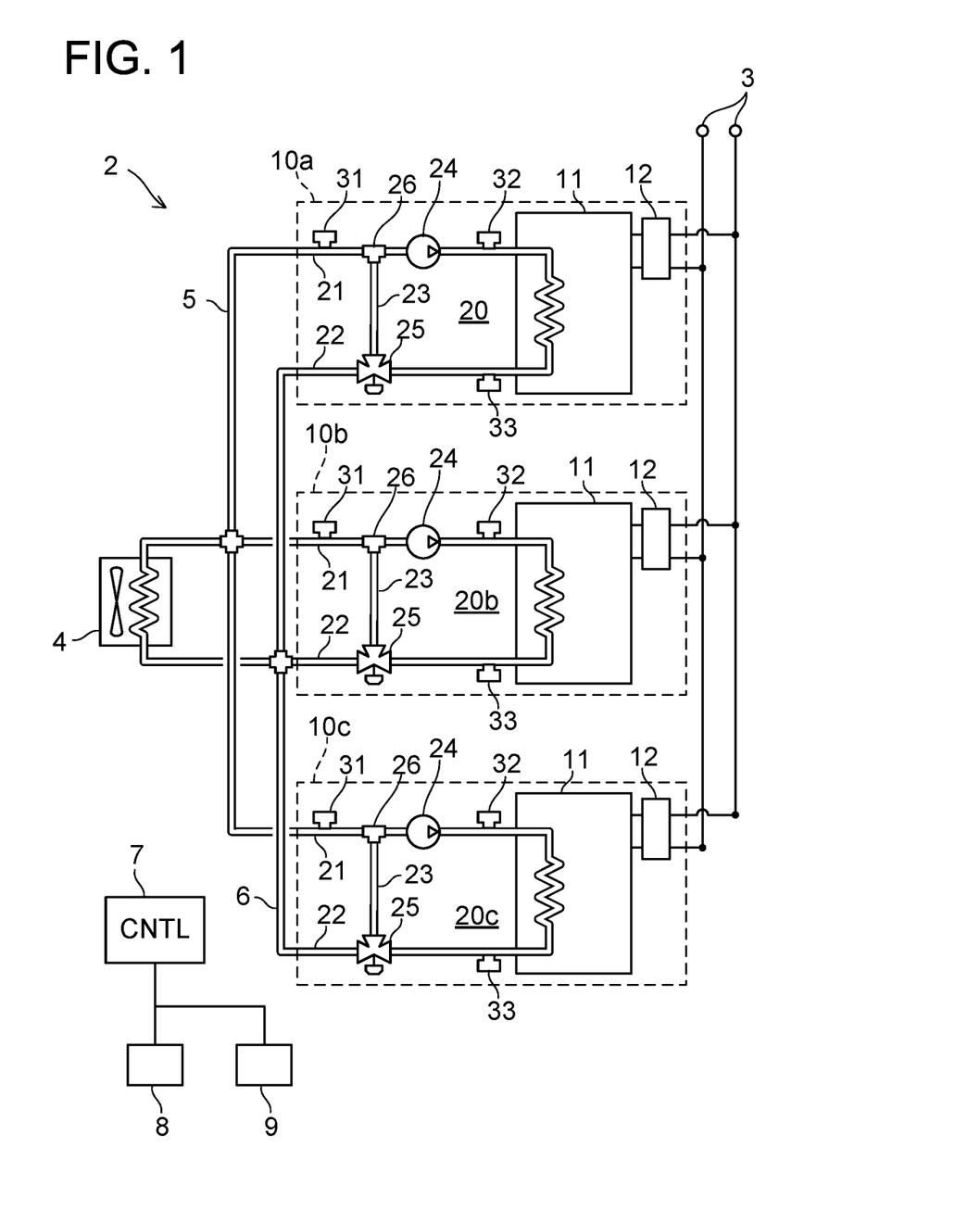
FIG. 1 illustrates a block diagram of a fuel cell system of an embodiment.

With reference to figures, an FC system 2 of an embodiment will be described. As described above, "FC" is a simpler term of a fuel cell. FIG. 1 illustrates a block diagram of the FC system 2. A controller 7 and respective devices (FC stacks 11, step-up converters 12, pumps 24, switch valves 25, temperature sensors 31 to 33) are connected to one another via communication lines, however, illustration of the communication lines is omitted.

The FC system 2 is a power source which generates electricity using the three FC stacks 11, and is configured to supply electric power to a different device from a system output terminal 3.

The FC system 2 includes the three FC units 10a to 10c, a cooler 4, and a controller 7. The three FC units 10a to 10c have the same structures. The three FC units 10a to 10c may be referred to as FC units 10 when they are described without distinction therebetween.

Each of the FC units 10 includes a FC stack 11 and a refrigerant circuit 20. Each of the FC stacks 11 is configured to generate electricity. In each of the FC units 10, the refrigerant circuit 20 receives a cool refrigerant from the cooler 4 and cools the FC stack 11. The refrigerant 20) circuit 20 returns the refrigerant that passed through the FC stack 11 to the cooler 4. The cooler 4 is a radiator configured to release heat of the refrigerant to air.

The step-up converter 12 accompanies each of the FC stacks 11. The step-up converter 12 is connected to a power output terminal of the FC stack 11, and an output terminal of the step-up converter 12 is connected to the system output terminal 3. The step-up converter 12 is configured to step up direct current generated by the FC stack 11 and supply the same to the system output terminal 3. The electricity generated by the plurality of FC stacks 11 is suppled from the system output terminal 3 to a different device. Even when output voltages of the plurality of FC stacks 11 are different, outputs of the plurality of FC stacks 11 can be summed and outputted from the system output terminal 3 by equalizing output voltages of the step-up converters 12. When electric power is supplied to a device driven by alternating currents, an inverter is connected between the device and the system output terminal 3.

In each of the FC stacks 11, fuel gas (hydrogen gas) and air (oxygen) react, by which electricity is generated. The controller 7 controls amounts of fuel gas and air to be supplied to each of the FC stacks 11, by which desired electricity can be obtained. Illustration of device(s) for supplying fuel gas and air to each of the FC stacks 11 is omitted.

A temperature of each of the FC stacks 11 rises during generation of electricity. The FC system 2 includes the same number of refrigerant circuits 20 as the FC stacks 11, and each of the refrigerant circuits 20 can separately cool its corresponding FC stack 11.

Although the FC system 2 includes the plurality of refrigerant circuits 20 (plurality of FC units 10a to 10c), the plurality of refrigerant circuits 20 shares one cooler 4. A common supply passage 5 and a common return passage 6 are connected to the cooler 4. The common supply passage 5 supplies the refrigerant to the plurality of refrigerant circuits 20 and the common return passage 6 returns the refrigerant flown out of the plurality of refrigerant circuits 20 (refrigerant which passed through the FC stacks 11) to the cooler 4.

The plurality of FC units 10 has the refrigerant circuits 20 having the same structure as one another. Each of the refrigerant circuits 20 includes a supply passage 21, a return passage 22, a circulating passage 23, a pump 24, a switch valve 25, a fluid joint 26, and temperature sensors 31 to 33. The supply passage 21 supplies the refrigerant to its corresponding FC stack 11 from the cooler 4. The return passage 22 returns the refrigerant that passed through the FC stack 11 to the cooler 4. The supply passage 21 communicates with the cooler 4 via the common supply passage 5, and the return passage 22 communicates with the cooler 4 via the common return passage 6. As described above, heat of the refrigerant that passed through the FC stack 11 is released at the cooler 4 to the air, and then the refrigerant is supplied to the FC stack 11 again.

The circulating passage 23 is connected to the supply passage 21 and the return passage 22. The circulating passage 23 returns the refrigerant in the return passage 22 (refrigerant that passed through the FC stack 11) to the supply passage 21. The switch valve 25 is disposed at a connecting point of the circulating passage 23 and the return passage 22. The switch valve 25 is configured to set a destination of the refrigerant flowing in the return passage 22 to one of the cooler 4 and the circulating passage 23. The switch valve 25 is controlled by the controller 7. The circulating passage 23 and the supply passage 21 are coupled by the fluid joint 26.

The pump 24 is disposed on the supply passage 21. The pump 24 is configured to pump the refrigerant to the FC stack 11. The controller 7 controls the pump 24. By adjustment of an output of the pump 24, a flow rate of the refrigerant supplied to the FC stack 11 (i.e., cooling performance) can be adjusted.

Two temperature sensors (a first temperature 31 and a second temperature sensor 32) are disposed on the supply passage 21. The first temperature sensor 31 is disposed at a position upstream of a merging point (fluid joint 26) of the circulating passage 23 and the supply passage 21, and the second temperature sensor 32 is disposed at a position downstream of the merging point (fluid joint 26). In other words, the first temperature sensor 31 is disposed on the supply passage 21 between the merging point (fluid joint 26) and the cooler 4, and the second temperature sensor 32 is disposed on the supply passage 21 between the merging point (fluid joint 26) and the FC stack 11. The first temperature sensor 31 is configured to measure a temperature of the refrigerant supplied from the cooler 4. The second temperature sensor 32 is configured to measure a temperature of the refrigerant flowing into the FC stack 11. The merging point (fluid joint 26) is positioned between the first temperature sensor 31 and the second temperature sensor 32. When the refrigerant that passed through the FC stack 11 flows through the circulating passage 23 into the supply passage 21, measured values of the first temperature sensor 31 and the second temperature sensor 32 may be different.

The third temperature sensor 33 is disposed on the return passage 22. The third temperature sensor 33 is configured to measure a temperature of the refrigerant flowing in the return passage 22 (i.e., temperature of the refrigerant that passed through the FC stack 11). A measured value of the third temperature sensor 33 is dealt as an approximation value of the temperature of the FC stack 11.

The controller 7 adjusts an output of the pump 24 so that the measured value of the third temperature sensor 33 (approximation temperature of the FC stack 11) is within a predetermined allowable temperature range. When the measured value of the second temperature sensor 32 (temperature of the refrigerant flowing into the FC stack 11) is low, the controller 7 controls the switch valve 25 and sets the destination of the refrigerant in the return passage 22 to the circulating passage 23 so that the refrigerant that passed through the FC stack 11 returns to the FC stack 11. By returning the refrigerant that passed through the FC stack 11 again to the FC stack 11, drastic decrease in the temperature of the FC stack 11 can be prevented.

As described above, the three FC units 10a to 10c have the same structure, thus explanations for the other FC units 10b, 10c are omitted.

The controller 7 of the FC system 2 periodically checks if the temperature sensors 31 to 33 of each of the FC units 10 are operating normally. A display 8 and a host controller 9 are connected to the controller 7. When any of the temperature sensors malfunction, the controller 7 sends a signal providing notification about malfunction of the temperature sensor to the display 8 and the host controller 9.

Figure 2:
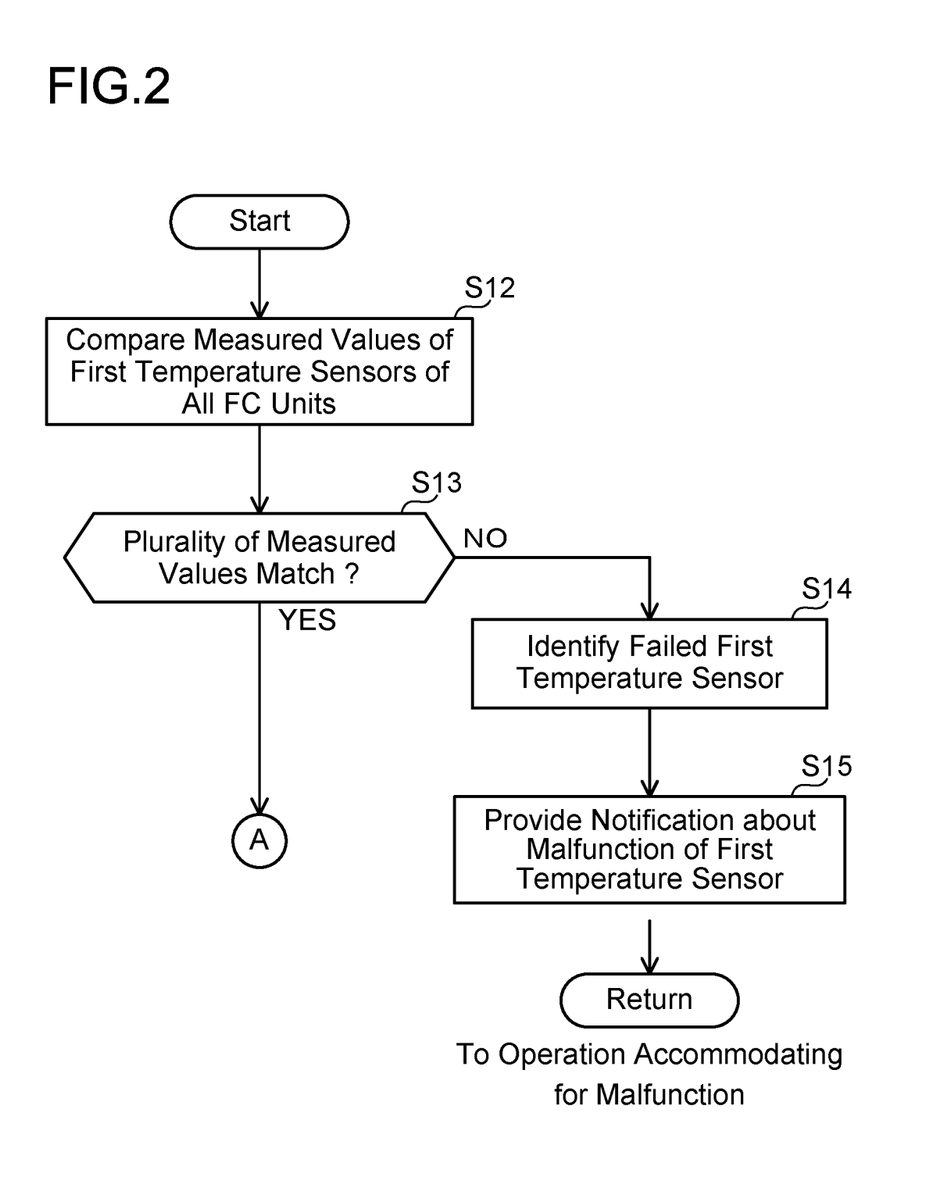
FIG. 2 illustrates a flowchart of a temperature sensor check process.
Figure 3:
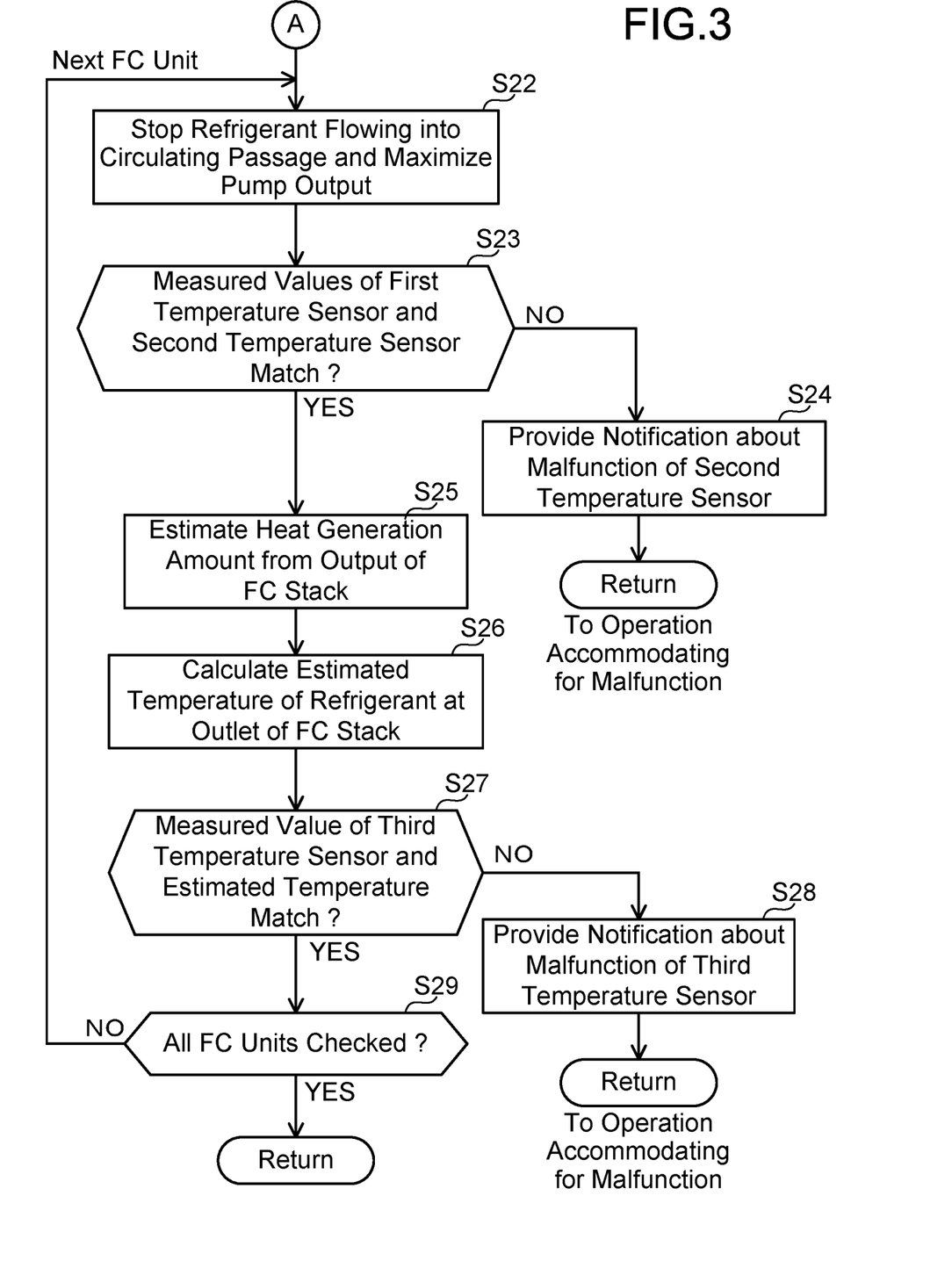
FIG. 3 illustrates the flowchart of the temperature sensor check process (continuation of FIG. 2)

With reference to FIG. 2 and FIG. 3, a temperature sensor check process performed by the controller 7 will be explained. The controller 7 periodically performs the process of FIGS. 2 and 3 while at least one of the FC stacks 11 generates electricity. Even while the temperature sensor check process is performed, the controller 7 adjusts the output of the pump 24 of each of the operating FC unit(s) 10 so that a temperature of each of the FC stack(s) 11 (measured value of the corresponding third temperature sensor 33) is within the predetermined allowable temperature range. A target output of the FC system 2 is externally given to the controller 7. The controller 7 operates the plurality of FC units 10 to meet the target output.

FIG. 2 is a flowchart of a process in which the measured values of the first temperature sensors 31 of the three FC units 10 are compared and presence of malfunction of the first temperature sensors 31 is checked.

The controller 7 obtains the measured values of the first temperature sensors 31 of all the FC units 10 (all the refrigerant circuits 20) and compares the same (step S12). Each of the plurality of first temperature sensors 31 measures a temperature of the refrigerant supplied from the common cooler 4. Therefore, if all the plurality of first temperature sensors 31 operate normally, the measured values of the plurality of first temperature sensors 31 match. If one of the measured values is different from the other two measured values, it can be determined that the first temperature sensor 31 of which measured value is different is malfunctioning. When the measured values of the plurality of first temperature sensors 31 match, the controller 7 determines that the plurality of first temperature sensors 31 operate normally (step S13: YES). When one of the measured values is different from the other two measured values (step S13: NO), the controller 7 identifies the failed first temperature sensor 31 (step S14) and provides notification about malfunction of the identified first temperature sensor 31 (step S15).

The controller 7 determines that "measured values match" when a difference between two measured values is smaller than a predetermined allowable difference.

When the FC system 2 includes three or more FC units 10 (i.e., three or more first temperature sensors 31), the controller 7 can identify the malfunctioning first temperature sensor 31 under the rule of majority among the measured values. In other words, the controller 7 can determine that the first temperature sensor 31 of which measured value greatly deviates from the other measured values malfunctions.

When the FC system 2 includes two FC units 10 (i.e., two first temperature sensors 31), the controller 7 identifies the malfunctioning temperature sensor 31 by the following process. That is, in each of the FC units 10, the controller 7 controls the switch valve 25 so as not to flow the refrigerant to the circulating passage 23. Next, in each of the FC units 10, the controller 7 compares the measured value of the first temperature sensor 31 and the measured value of the second temperature sensor 32. When the refrigerant is not flowing in the circulating passage 23, a temperature of the refrigerant is the same at positions upstream and downstream of the fluid joint 26. When the measured values of the first temperature sensor 31 and the second temperature sensor 32 are different, the controller 7 determines that the first temperature sensor 31 malfunctions.

When any of the first temperature sensors 31 malfunction (step S13: NO), the controller 7 terminates the temperature sensor check process and shifts to system operation accommodating for the malfunction of the first temperature sensor 31. The system operation accommodating for malfunction of the first temperature sensor 31 is for example as follows. The controller 7 stops the FC unit 10 including the malfunctioning first temperature sensor 31 and generates required electricity using the FC units 10 other than the stopped FC unit 10.

When the measured values of the plurality of first temperature sensors 31 match, the controller 7 shifts to the process of FIG. 3.

In a specific FC unit 10, the controller 7 controls the switch valve 25 so as not to flow the refrigerant to the circulating passage 23 and drives the pump 24 at its maximum (step S22). Next, the controller 7 compares the measured values of the first temperature sensor 31 and the second temperature sensor 32 of the specific FC unit 10 (step S23). As described above, when the refrigerant does not flow in the circulating passage 23, the temperature of the refrigerant is the same at positions upstream and downstream of the fluid joint 26. Therefore, when the measured values of the first temperature sensor 31 and the second temperature sensor 32 do not match, the controller 7 can determine that the second temperature sensor 32 is malfunctioning. When the measured values of the first temperature sensor 31 and the second temperature sensor 32 do not match (step S23: NO)), the controller 7 provides notification about malfunction of the second temperature sensor 32 of the specific FC unit 10 (step S24). On the other hand, when the measured values of the first temperature sensor 31 and the second temperature sensor 32 match, the controller 7 determines that the second temperature sensor 32 operates normally (step S23: YES). In step S23 as well, when a difference between the measured values between the first temperature sensor 31 and the second temperature sensor 32 is smaller than a predetermined allowable difference, the controller 7 determines that the measured values of the first temperature sensor 31 and the second temperature sensors 32 match.

When it is determined that the second temperature sensor 32 operates normally (step S23: YES), the controller 7 estimates a heat generation amount of the FC stack 11 (step S25). The heat generation amount of the FC stack 11 can be estimated from the output of the FC stack 11. The controller 7 calculates an estimated temperature of the refrigerant at an outlet of the FC stack 11 from the measured value of the second temperature sensor 32 and the estimated heat generation amount (step S26). When the estimated temperature of the FC stack 11 and the measured value of the third temperature sensor 33 match, the controller 7 determines that the third temperature 30) sensor 33 also operates normally (step S27: YES). When the estimated temperature of the FC stack 11 and the measured value of the third temperature sensor 33 do not match, the controller 7 determines that the third temperature sensor 33 is malfunctioning and provides notification about malfunction of the third temperature sensor 33 (step S27: NO, S28).

When YES is determined in step S27, the controller 7 determines that all the three temperature sensors 31, 32, 33 of the specific FC unit 10 operate normally. The controller 7 performs the processes from step S22 to step S28 for all the FC units 10 (step S29: NO, S22).

When malfunction of the second temperature sensor 32 is detected (step S23: NO) or malfunction of the third temperature sensor 33 is detected (step S27: NO)), the controller 7 shifts to a system operation accommodating for the malfunction of the temperature sensor. For example, the controller 7 stops the FC unit 10 including the malfunctioning second temperature sensor 32 (or the malfunctioning third temperature sensor 33) and generates necessary electricity using the FC units 10 other than the stopped FC unit 10.

By the processes of FIGS. 2 and 3, the controller 7 can check all the temperature sensors of all the FC units 10.

Figure 4:
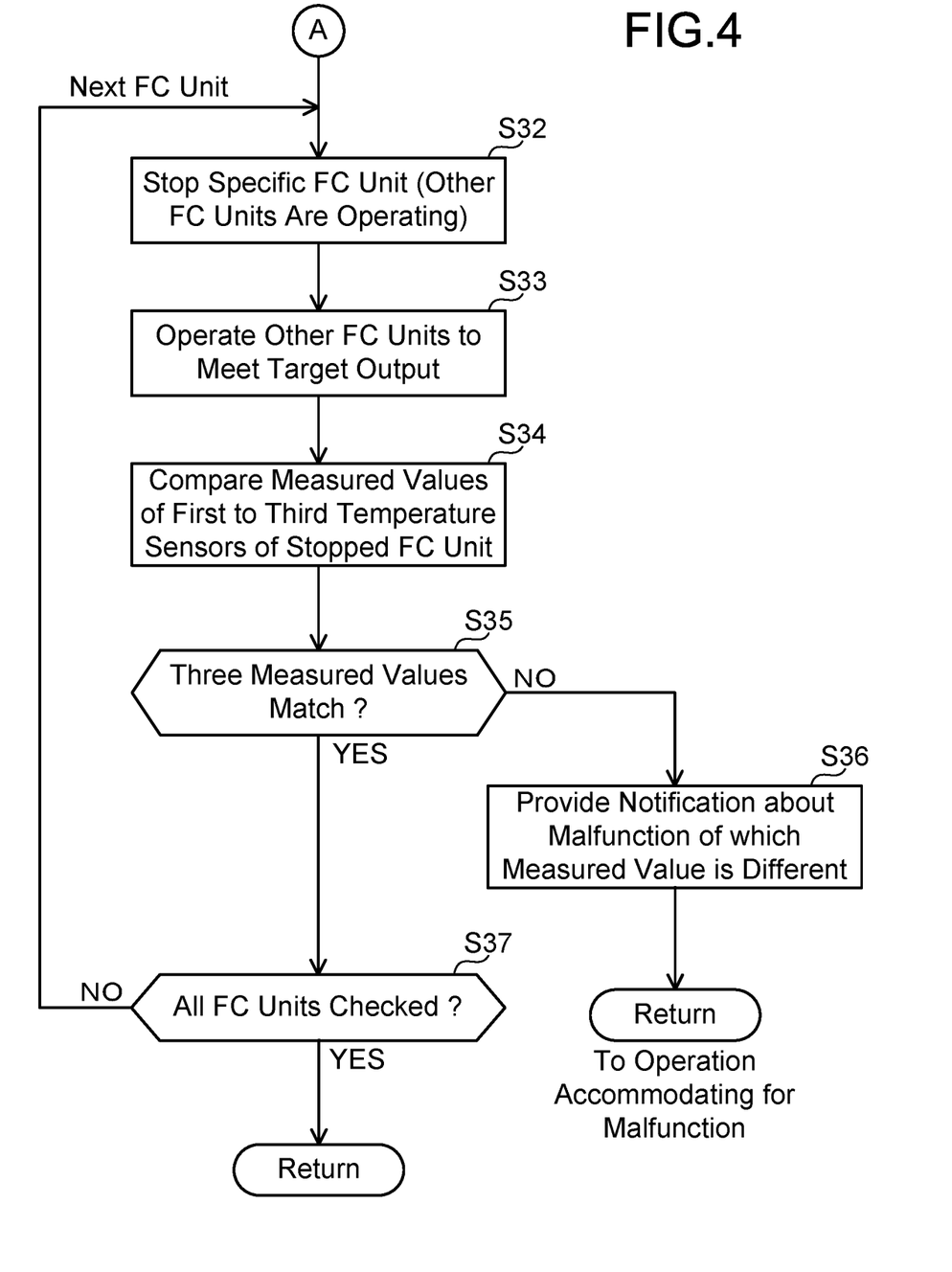
FIG. 4 illustrates a flowchart of a temperature sensor check process of a variant.

(Variant) With reference to FIG. 4, a temperature sensor check process of a variant will be described. The process of FIG. 4 is performed instead of the process of FIG. 3. In other words, the process of FIG. 4 is performed after the process of comparing the measured values of the first temperature sensors 31 of the plurality of FC units 10 (process of FIG. 2) is performed. The controller 7 stops a specific FC unit 10 (step S32). "Stops the FC unit 10" means to stop output of the FC stack 11 of the FC unit 10. In other words, "stops the FC unit 10" means to stop supply of fuel and oxygen to the FC stack 11 of the FC unit 10. At this point, the controller 7 operates the other FC units 10 (the other FC stacks 11) to meet the target output given to the FC system 2 (step S33). Accordingly, the process of FIG. 4 can be performed only when the target output can be met by the two FC units 10.

Next, the controller 7 compares the measured values of the temperature sensors 31 to 33 of the stopped FC unit 10 (step S34). Since the FC unit 10 is stopped, a temperature of the refrigerant is the same at any point of the supply passage 21 and the return passage 22. For this reason, when the measured values of the temperature sensors 31 to 33 do not match (step S35: NO), the controller 7 determines that the temperature sensor of which output value deviates from the other measured values malfunctions. The controller 7 provides notification about malfunction of the temperature sensor of which output value is difference (step S36).

When all the measured values match (step S35: YES), the controller 7 determines that the temperature sensors 31 to 33 normally operate. The controller 7 performs the processes of steps S32 to S36 for all the FC units 10 (step S37: NO, S32).

When malfunction of the temperature sensor is detected, the controller 7 shifts to a system operation accommodating for the malfunction of the temperature sensor. An example of the system operation accommodating for the malfunction of the temperature sensor is as follows. While stopping the FC unit 10 including the temperature sensor of which malfunction is detected, the controller 7 operates the FC units 10 other than the stopped FC unit 10 and supplies a predetermined output.

With the process of FIG. 4 as well, presence of malfunction of the temperature sensors 31 to 33 of each FC unit 10 can be checked.

Notes related to the technique explained in the embodiment will be described. The FC system disclosed herein may include four or more FC units connected in parallel.

When malfunction of the first temperature sensor 31 or the second temperature sensor 32 is detected in step S35 of FIG. 4, the controller 7 provides notification about malfunction of the temperature sensor but may continue operation of the FC unit 10 including the malfunctioning temperature sensor without stopping it. This is because even when one of the first temperature sensor 31 and the second temperature sensor 32 fails, a temperature of the FC stack 11 of the FC unit 10 can be substantially maintained within a substantially allowable temperature range as long as the other of the first temperature sensor 31 and the second temperature sensor 32 operates normally. When one of the first temperature sensor 31 and the second temperature sensor 32 malfunctions, however, the controller 7 restricts maximum output of the FC unit 10 including the malfunctioning temperature sensor. Further, the controller 7 outputs a signal indicating that the temperature sensor is malfunctioning.

In the process of step S26 of FIG. 3, in addition to the heat generation amount of the FC stack 11 and the measured value of the second temperature sensor 32, an estimated temperature of the refrigerant at the outlet of the FC stack 11 may be calculated using a flow rate of the refrigerant flowing in the FC stack 11. By further using the flow rate, the estimated temperature of the refrigerant at the outlet of the FC stack 11 can be obtained with more accuracy. The flow rate can be obtained from the output of the pump 24.

The process of FIG. 4 may be performed for each of the FC units without performing the process of FIG. 2, because malfunction of any of the temperature sensors 31 to 33 can be detected by the process of FIG. 4.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. Further, the purpose of the examples illustrated by the present description or drawings is to satisfy multiple objectives simultaneously, and satisfying any one of those objectives gives technical utility to the present disclosure.

What is claimed is:

1. A fuel cell system comprising:
a plurality of fuel cell units;
a cooler; and
a controller,
wherein
each of the plurality of the fuel cell units comprises:
a fuel cell stack;
a supply passage for supplying refrigerant from the cooler to the fuel cell stack;
a return passage for returning the refrigerant which passed through the fuel cell stack to the cooler;
a circulating passage connected to the supply passage and the return passage, the circulating passage being for returning the refrigerant in the return passage to the supply passage;
a switch valve configured to set a destination of the refrigerant flowing in the return passage to one of the cooler and the circulating passage;
a first temperature sensor configured to measure a temperature of the refrigerant in the supply passage at a position upstream of a merging point of the supply passage and the circulating passage;
a second temperature sensor configured to measure a temperature of the refrigerant in the supply passage at a position downstream of the merging point; and
a third temperature sensor configured to measure a temperature of the refrigerant in the return passage, and
when measured values of the first temperature sensors of the plurality of the fuel cell units do not match, the controller is configured to provide notification about malfunction of the first temperature sensor of at least one of the plurality of fuel cell units.

2. The fuel cell system of claim 1, wherein when the measured values of the first temperature sensors of the plurality of the fuel cell units match, the controller is configured to, for each of the fuel cell units:
control the switch valve so as not to flow the refrigerant to the circulating passage; and when a measured value of the first temperature sensor is different from a measured value of the second temperature sensor, provide notification about malfunction of the second temperature sensor.

3. The fuel cell system of claim 2, wherein, for each of the fuel cell unit, when the measured value of the first temperature sensor and the measured value of the second temperature sensor match, the controller is configured to:
calculate an estimated temperature of the refrigerant at an outlet of the fuel cell stack from the measured value of the second temperature sensor and an output of the fuel cell stack; and
when a measured value of the third temperature sensor is different from the estimated temperature, provide notification about malfunction of the third temperature sensor.

4. The fuel cell system of claim 1, wherein the controller is configured to, for each of the plurality of the fuel cell unit, operate a pump configured to pump the refrigerant to the fuel cell stack at maximum power while checking the measured value of the second temperature sensor or the third temperature sensor.

5. The fuel cell system of claim 1, wherein when the measured values of the first temperature sensors of the plurality of the fuel cell units match, the controller is configured to:
stop a specific fuel cell unit among the plurality of the fuel cell units;
operate the fuel cell units other than the specific fuel cell unit so that a total output of the fuel cell system matches a target output;
compare measured values of the first, second and third temperature sensors of the specific fuel cell unit; and
when one of the measured values differs from the other two of the measured values, provide notification about malfunction of the temperature sensor with the different measured value.

* * * * *